(12) United States Patent
Aoki

(10) Patent No.: US 8,155,832 B2
(45) Date of Patent: Apr. 10, 2012

(54) APPARATUS FOR REMOTE OPERATION

(75) Inventor: Takashi Aoki, Gifu (JP)

(73) Assignee: Denso Corporation, Kariya (JP)

( * ) Notice: Subject to any disclaimer, the term of this patent is extended or adjusted under 35 U.S.C. 154(b) by 322 days.

(21) Appl. No.: 12/385,387

(22) Filed: Apr. 7, 2009

(65) Prior Publication Data

US 2009/0259357 A1    Oct. 15, 2009

(30) Foreign Application Priority Data

Apr. 11, 2008    (JP) .................................. 2008-103636

(51) Int. Cl.
- *G09G 5/00* (2006.01)
- *G06F 3/01* (2006.01)
- *G06F 3/033* (2006.01)
- *G01C 21/00* (2006.01)

(52) U.S. Cl. ........................... 701/36; 345/161; 715/701
(58) Field of Classification Search ................... 701/29, 701/36; 345/161, 157; 715/701
See application file for complete search history.

(56) References Cited

U.S. PATENT DOCUMENTS

| | | | | |
|---|---|---|---|---|
| 5,563,629 A | * | 10/1996 | Caprara | 345/160 |
| 6,961,644 B2 | * | 11/2005 | Mercier et al. | 701/36 |
| 7,084,859 B1 | * | 8/2006 | Pryor | 345/173 |
| 2004/0150674 A1 | * | 8/2004 | Takahashi et al. | 345/810 |
| 2005/0068296 A1 | | 3/2005 | Yoshida | |

FOREIGN PATENT DOCUMENTS

| | | |
|---|---|---|
| JP | A-2003-123185 | 4/2003 |
| JP | A-2004-026050 | 1/2004 |
| JP | A-2005-082029 | 3/2005 |
| JP | A-2005-263155 | 9/2005 |
| JP | A-2005-313794 | 11/2005 |
| JP | A-2006-178861 | 7/2006 |
| JP | A-2007-261308 | 10/2007 |
| JP | A-2007-302215 | 11/2007 |

OTHER PUBLICATIONS

Notification of Reason(s) for Rejection issued on Mar. 9, 2010 by the Japan Patent Office in corresponding Japanese Application No. 2008-103636 (English translation enclosed).

Notification of Reasons for Rejection dated Jul. 26, 2010 by the Japan Patent Office in corresponding Japanese Application No. 2008-103636 (English translation enclosed).

Notification of Reasons for Rejection mailed on Nov. 17, 2010 from the Japan Patent Office in corresponding Japanese Application No. 2008-103636 (English translation enclosed).

* cited by examiner

*Primary Examiner* — Paul N. Dickson
*Assistant Examiner* — George D. Spisich
(74) *Attorney, Agent, or Firm* — Posz Law Group, PLC

(57) ABSTRACT

A remote operation apparatus in a vehicle has a display unit, an operation unit, a speed sensor, a brake sensor, a steer angle sensor, a side G sensor, and a control unit. The operation unit is capable of remotely controlling the display contents of the display unit. The operation of the operation unit is allowed when the vehicle is determined, by the control unit, to be stably traveling, and the operation of the operation unit is restricted when the vehicle is determined to be traveling unstably, based on information on the travel condition of the vehicle from those sensors. The remote operation apparatus having the above-described operation scheme facilitates a stable travel of the vehicle.

6 Claims, 6 Drawing Sheets

APPARATUS FOR REMOTE OPERATION

CROSS REFERENCE TO RELATED APPLICATION

The present application is based on and claims the benefit of priority of Japanese Patent Application No. 2008-103636, filed on Apr. 11, 2008, the disclosure of which is incorporated herein by reference.

FIELD OF THE DISCLOSURE

The present disclosure generally relates to a remote operation apparatus for use in a vehicle.

BACKGROUND INFORMATION

In recent years, increasing number of automotive vehicles are equipped with a display unit for displaying various information in a view of the driver, that is, at a position such as a front portion of the vehicle compartment (e.g., a far-front side of the driver's seat), so that a move of a driver's look direction should be decreased. In those vehicles, the display unit is out of reach of the driver, and thereby making it difficult for the driver to perform a stable touch operation on the display unit. Therefore, instead of allowing a direct touch on the display unit (e.g., allowing a touch on a switch image shown on the display unit), an operation unit is provided on, for example, a center console for in-directly operating the display contents of the display unit based on a remote control of the operation unit in general (see Japanese patent document JP-A-2005-100151, or an equivalent US publication US20050068296).

However, a remote control apparatus disclosed in the above patent document is susceptible to a mis-input, if the vehicle's travel condition becomes unstable due to a steep braking, a steep turn or the like while the operation unit of the remote control apparatus is operated. Further, if required consciousness for operating the operation unit is too demanding for the driver of the vehicle, which leads to the deteriorated concentration on the driving operation, or, in other words, that leads to the distraction of the driver's attention from the driving operation, thereby making it difficult for the driver to stabilize the travel condition of the vehicle.

SUMMARY OF THE DISCLOSURE

In view of the above and other problems, the present disclosure provides a remote operation apparatus that considers a stable travel of the vehicle.

In an aspect of the present disclosure, a remote operation apparatus includes: an operation unit for remotely operating display contents displayed on a display unit; a travel condition acquisition unit for acquiring information on a travel condition of a subject vehicle; and a control unit for allowing an operation of the operation unit if the travel condition of the subject vehicle is determined to be in a stable condition and for restricting the operation of the operation unit if the travel condition of the subject vehicle is determined to be in a non-stable condition, based on the information acquired by the travel condition acquisition unit. In this case, "restricting the operation" basically indicates invalidation of the operation by using the operation unit. That is, depending on the function of the operation unit used for the operation, an input operation by using the operation unit may be, for example, made to be difficult, or the input operation itself may be rejected (i.e., the target device of the operation in the vehicle is not operated).

The remote operation apparatus of the present disclosure allows the operation of the operation unit under control by the control unit, if it is determined that the subject vehicle is in a stable condition, based on information acquired by the travel condition acquisition unit. On the other hand, if it is determined that the subject vehicle is in a non-stable condition, the operation of the operation unit is restricted by the control unit.

Therefore, even if the travel condition of the subject vehicle is unstable, the mis-input from the operation unit is prevented due to the restriction of the operation of the operation unit. As a result, the concentration on the driving operation of the driver is maintained, that is, is kept unchanged, thereby easily enabling the stabilization of the travel condition of the subject vehicle.

BRIEF DESCRIPTION OF THE DRAWINGS

Objects, features, and advantages of the present disclosure will become more apparent from the following detailed description made with reference to the accompanying drawings, in which.

DETAILED DESCRIPTION a. First Embodiment

Figure 1:
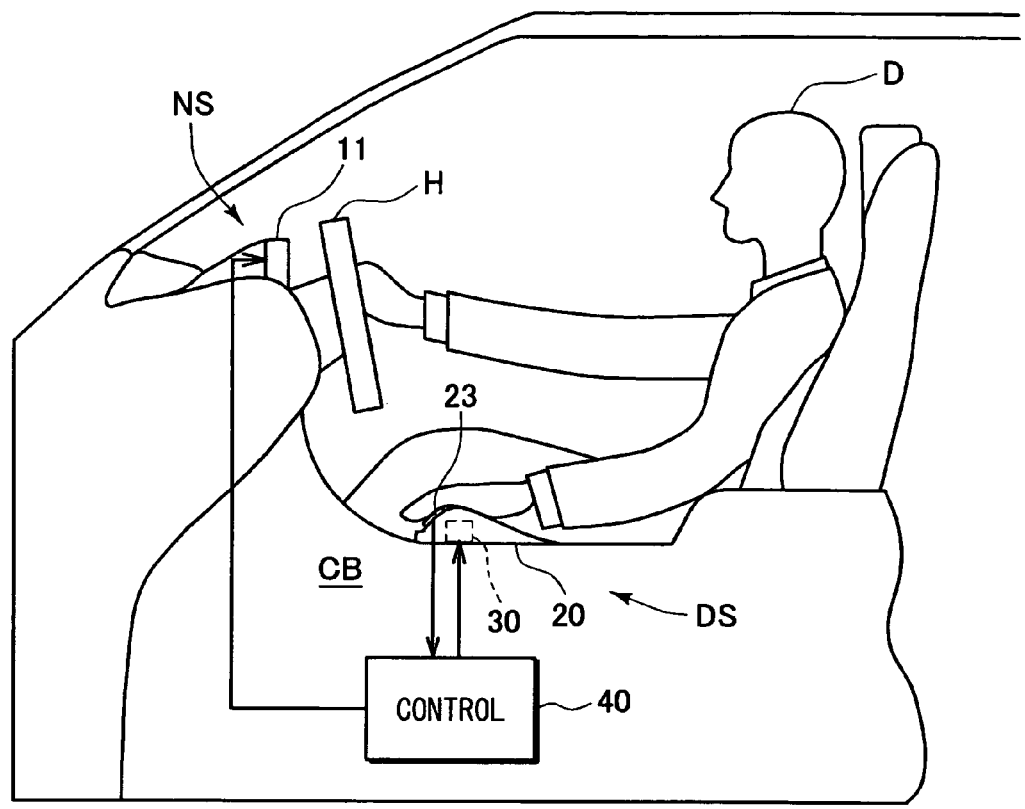
FIG. 1 is a conceptual diagram of a device operation system in an embodiment of the present disclosure.

Hereafter, with reference to the drawing, the first embodiment of the present disclosure is described. FIG. 1 is an overview that schematically illustrates a remote operation apparatus according to the present invention, and the remote operation apparatus is realized as a combination of a well-known type navigation system NS and a centralized device operation system DS, that is, the system DS for remotely controlling the display contents of a display unit 11 of the navigation system NS.

The navigation system NS includes, besides the display unit 11, well-known type components such as a position detector, a map data input unit, a voice synthesizer circuit, a speaker, a memory, a transceiver, a hard disk drive, an interface unit, and a control circuit (i.e., a navigation ECU) connected to those components. The display unit 11 is arranged at the front of a vehicle compartment close to a viewing range of a driver D (i.e., at a far front position of a driver's seat), and displays, as the display contents, various command switches and a pointer for pointing the command switches as well as a vehicle symbol superposed on a road map.

Figure 2:
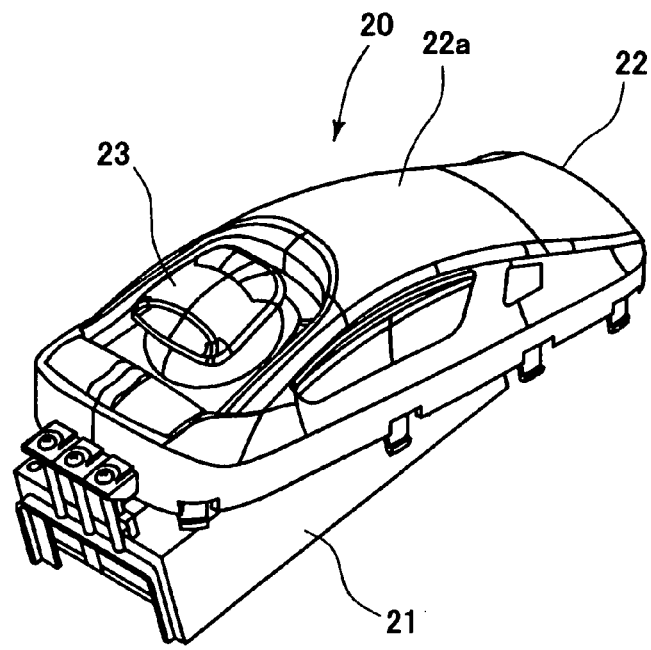
FIG. 2 is a perspective view of an operation unit of the device operation system in FIG. 1.

The centralized device operation system DS includes an operation unit 20, a reaction force generation mechanism 30, and a control unit 40. The operation unit 20 is assembled on a console box CB in the palm neighborhood of the left hand side (on the right hand side in case of the left-hand-drive vehicle) for the ease of operation by the driver D. The operation unit 20 is composed of, as shown in FIG. 2, a main body 21, and a case 22 that covers the upper side of the main body 21, and an operation knob 23 arranged in an exposed manner from an open mouth of the case 22 for allowing a direct operation of the user. The operation knob 23 serves as a so-called haptic device.

The main body 21 of the operation unit 20 is connected with the control unit 40, and transmits, to the control unit 40, manipulation signals corresponding to a move in the front, back, left and right directions of the operation knob 23. The case 22 has a streamline shape, with its center and rear-half portion serving as a palm rest 22*a*.

Figure 3:
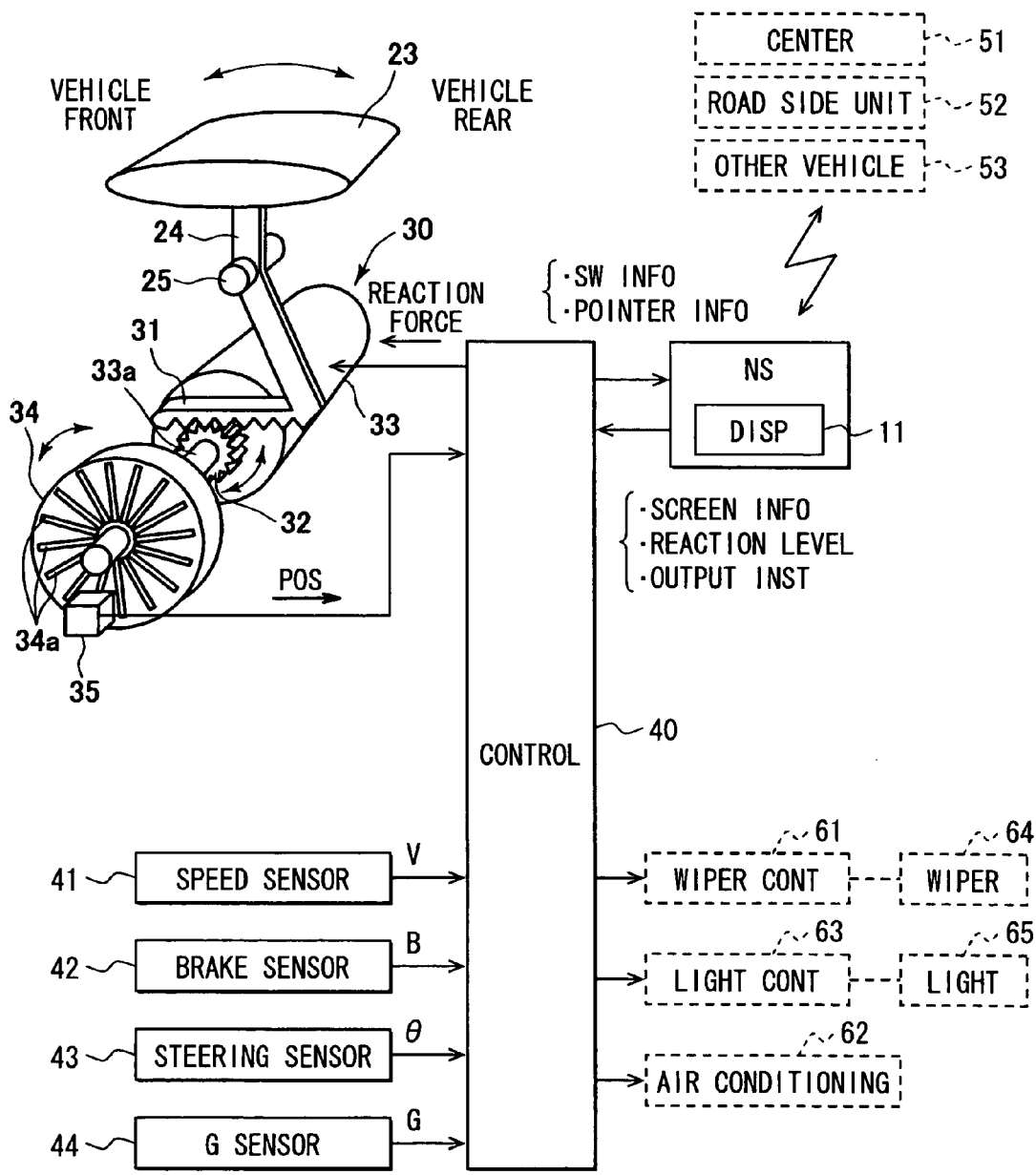
FIG. 3 is a block diagram of the device operation system regarding exchange of information and control of the system.

The operation knob 23 is configured to have a reaction force from the reaction force generation mechanism 30 when moved in the front, back, left and right directions. FIG. 3 shows an example of the movement of the knob 23 in the front and back directions. The operation knob 23 has a shaft 24 extending from a reverse side of the knob 23 in a vertical direction, and a lateral axis 25 extending from a middle part of the shaft 24 towards both sides of the vehicle. The shaft 24 and the lateral axis 25 are used to connect the knob 23 to the case 22. The lateral axis 25 allows the knob 23 to move in the front and back directions around the axis, and the shaft 24 allows the knob 23 to move along the shaft 24 (i.e., in the vertical direction) for an input of "Enter" equivalent signal.

The reaction force generation mechanism 30 is composed of a rack gear 31, a pinion gear 32, an electric motor 33, a code board 34, and a photo-interrupter 35. The rack gear 31 is integrally connected with the bottom part of the shaft 24 to extend in the front and back direction of the vehicle. The pinion gear 32 is fixed on a driving axis 33*a* of the electric motor 33, and is engaged with the rack gear 31. The electric motor 33 (i.e., an electric actuator) is built into the main body 21 of the operation unit 20, and provides the reaction force to the operation knob 23 according to the output instruction from the control unit 40 through the pinion gear 32, the rack gear 31, and the shaft 24.

The code board 34 is a circular board having a row of radial slits 34*a*, and is fixed on the driving axis 33*a* of the electric motor 33. The photo-interrupter 35 (i.e. an encoder module) is composed of a photo IC and a signal diode facing to each other with the code board 34 interposed therebetween. The photo IC contains a photo-diode, a preamplifier, a comparator, and an output buffer. The amount of rotation of the code board 34 that represents the operational movement of the knob 23 in the front and back direction as well as the rotation speed of the board 34 representing the operational speed of the knob 23 are detected by the photo-interrupter 35, and are output to the control unit 40.

Figure 5:
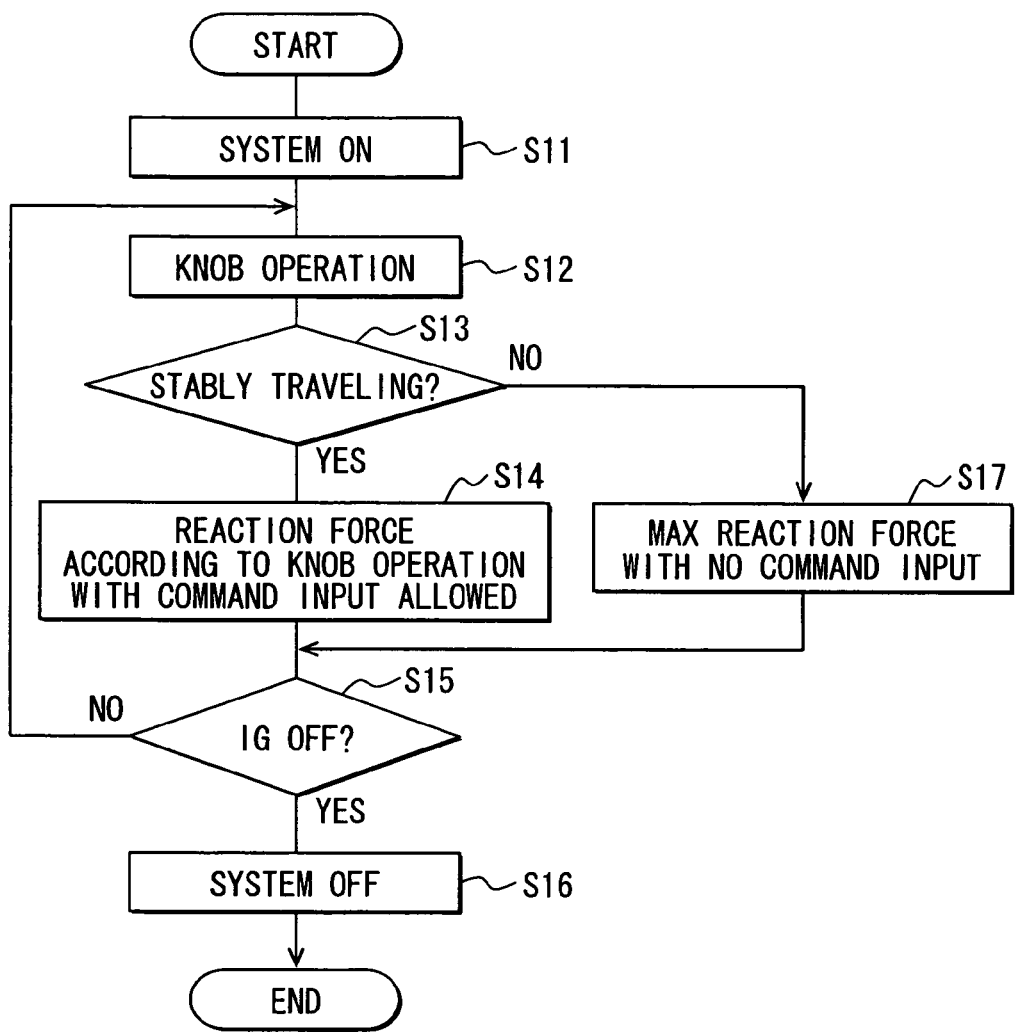
FIG. 5 is a flow chart of a process for controlling the device operation system in FIG. 1 in a first embodiment of the present disclosure.

The control unit 40 has, as its main component, a microcomputer consisting of a CPU, a ROM, a RAM, an I/O, a driving IC, and the like, and repeatedly executes a control program shown in FIG. 5 that is memorized in the ROM or the like. The control unit 40 can communicate with the navigation system NS through a vehicle LAN, and transmits position information of the operation knob 23 (i.e., switch information) and pointer information to the navigation system NS according to the sensor signal that is detected by the photo-interrupter 35. The navigation system NS displays on the display unit 11 a pointer in synchronization with the operation of the operation knob 23 upon receiving the information from the control unit 40. Further, the control unit 40 receives, from the navigation system NS, reaction force information for controlling the reaction force of the knob 23 according to the command information (i.e., screen information) to be displayed on the display unit 11, output instruction information and the like.

Figure 4:
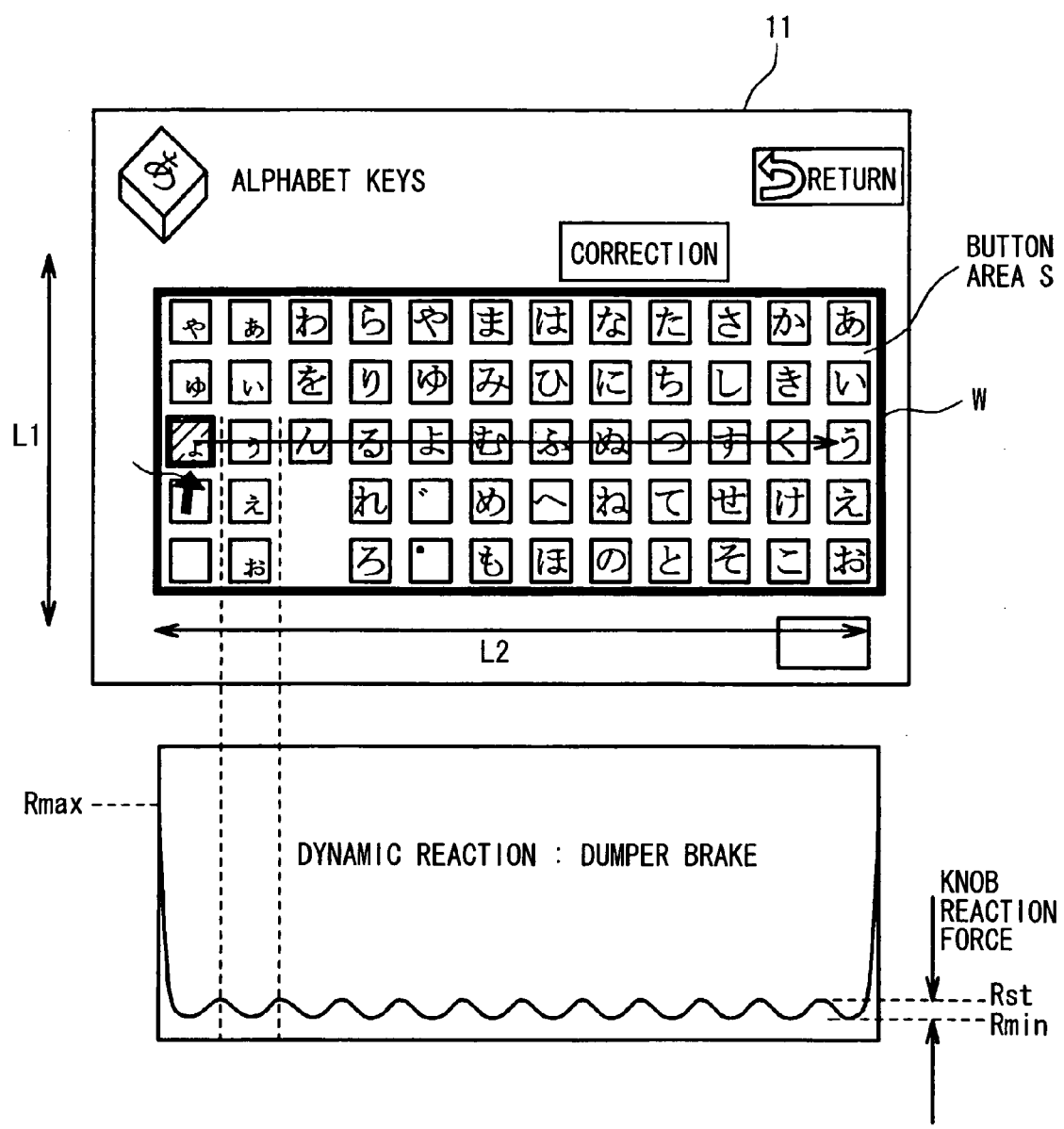
FIG. 4 is an illustration of a reaction force generated in association with display contents of a display unit.

More practically, for example, a pointer P is displayed on the display unit 11 corresponding to the operation position of the operation knob 23 in a Japanese alphabet key tops arrangement shown in FIG. 4 when the text input screen is displayed on the display unit 11. In FIG. 4, the illustration shows that the operation of the knob 23 has moved the pointer to a position of "yo (a pronunciation of one of Japanese alphabets shown in the "key top" having hatching)." In this case, the pointer P moves in a L1 direction on the screen if the knob 23 is operated in the front and back directions, or the pointer P moves in a L2 direction on the screen if the knob 23 is operated in the left and right directions, relative to the position of the key top "yo."

Further, if the user desires to move the pointer from the key top "yo" to a key top "u" on the right side, the operation knob 23 must be operated by a force that is equal to or greater than a predetermined threshold, thereby enabling the user to recognize the reaction force in the course of operation. That is, when the reaction force information is transmitted from the navigation system NS to the control unit 40, the control unit 40 use the information to control a torque of the motor 33 for creating a "click feel" by generating force against the user operation and for allowing the user to sense the reaction force (e.g., a dynamic reaction force, a dumper brake or the like). The reaction force thus generated is varied in a range between a standard reaction force Rst and a minimum reaction force Rmin according to the pointing position of the pointer P while the pointer P is within a button area S. As a result, the reaction force recognized by the user is in the range between Rst and Rmin.

Thus, the pointer P doesn't move outside of the button area S beyond a boundary W of the button area S unless the user applies a force exceeding a maximum reaction force Rmax. The maximum reaction force Rmax is, for example, set to a magnitude of 5 to 10 N, and the same reaction force is used to prohibit the operation of the operation knob 23 by the user.

The control unit 40 in FIG. 3 is connected to a speed sensor 41, a brake sensor 42, a steer angle sensor 43, and a side G sensor 44 respectively serving as a travel condition acquisition unit through the vehicle LAN. The speed sensor 41 detects and transmits a vehicle speed V to the control unit 40. The brake sensor 42 detects and transmits a step amount B of the brake pedal to the control unit 40. The steer angle sensor 43 detects and transmits, to the control unit 40, a steer angle $\theta$ of the steering wheel H, with, for instance, a distinction between a right turn and a left turn of the wheel H according to the positive and the negative value of the steer angle $\theta$. The side G sensor 44 detects and transmits, to the control unit 40, a lateral acceleration G of the vehicle.

Next, the operation scheme of the remote operation apparatus according to the control program in FIG. 5 is described. The control unit 40 turns on the centralized device operation system DS upon having a turn-on operation of the ignition switch (S11).

Figure 6:
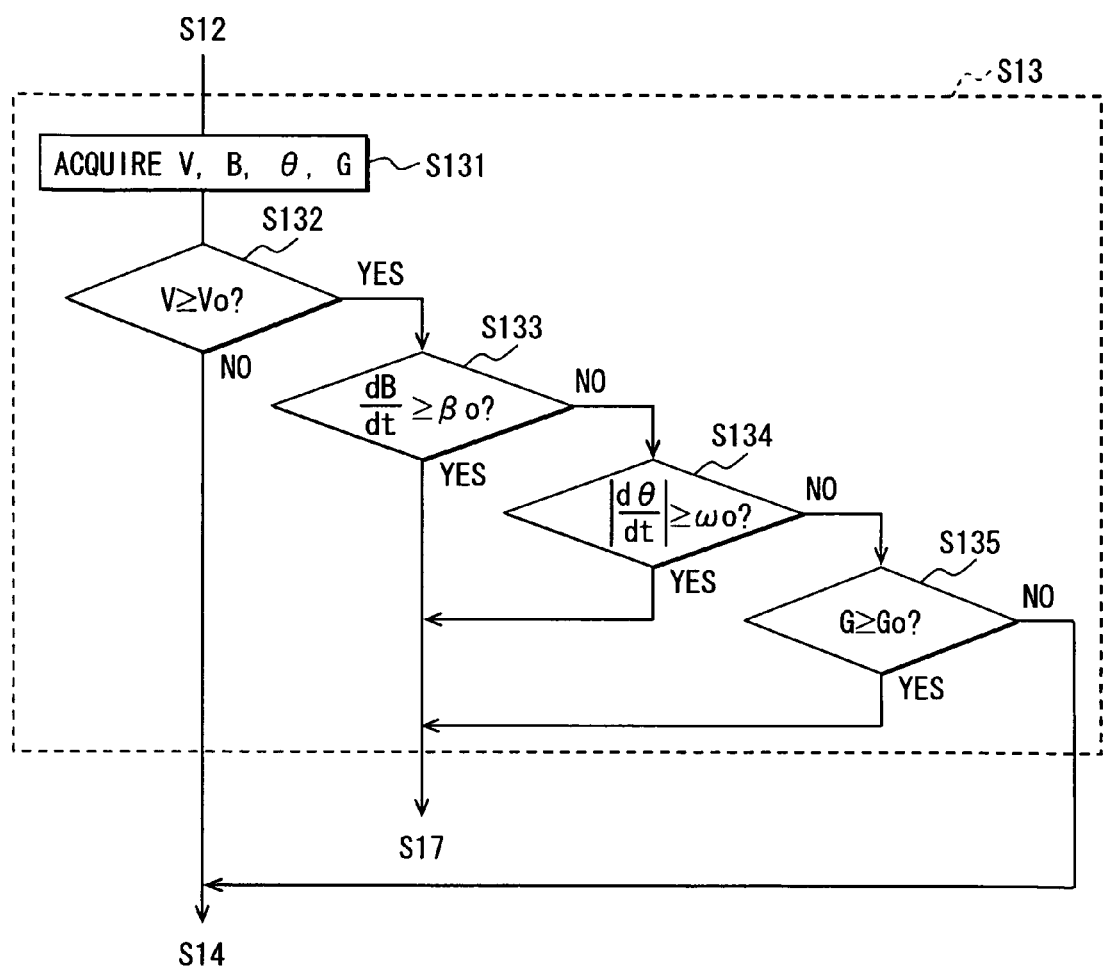
FIG. 6 is a flow chart of a step in the process of FIG. 5 for controlling the device operation system.

If the operation knob 23 is operated by the user (S12), it is determined whether the vehicle is traveling stably or not (S13). In S13, the determination processing shown in FIG. 6 is executed, for instance. More practically, the vehicle speed V, the brake pedal step amount B, the steer angle $\theta$ of the steer steering wheels H and the lateral acceleration G are respectively acquired from the speed sensor 41, the brake sensor 42, the steer angle sensor 43, and the side G sensor 44 (S131). Then, it is determined whether or not the speed V is equal to or exceeding a speed Vo (S132). The speed Vo is set to a sufficiently small value that allows a stable travel of the vehicle even when the vehicle steeply turns or steeply decelerates.

When the speed V is smaller than the speed Vo (S132 in FIG. 6:NO), the electric motor 33 is driven to generate the reaction force according to the operation of the operation knob 23 (see FIG. 4), and a command input by a press operation of the knob 23 to input the "Enter" equivalent signal is permitted (S13:YES, S14). The process from S12 to S14 is repeated until the turn-off of the ignition switch.

Therefore, a command input is freely allowed, in this case, according to the operation of the operation knob 23. The control unit 40 turns off the centralized device operation system DS (S16) upon having a turn-off operation of the ignition switch (S15:YES), and the execution of the control program is concluded.

When the speed V is equal to or exceeding the speed Vo (S132:YES), whether or not the vehicle is in a steep braking condition is determined. That is, a stepping speed of the brake pedal dB/dt is calculated based on the step amount B, and the stepping speed dB/dt is compared with a stepping speed βo. The stepping speed βo is set to a sufficiently great value that makes it difficult for the vehicle to maintain a stable travel condition if the steep braking of that magnitude is applied to the vehicle.

If the stepping speed dB/dt is smaller than the stepping speed βo (S133:NO), the process proceeds to S134, and whether the angular steer speed of the steering wheel H is calculated based on the steer angle θ. More practically, the angular steer speed dθ/dt is calculated based on the steer angle θ, and the angular steer speed dθ/dt is compared with an angular steer speed ωo. The angular steer speed ωo is set to a sufficiently great value that makes it difficult for the vehicle to maintain a stable travel condition if the steep turn of that magnitude is applied to the vehicle.

When the angular steer speed dθ/dt is smaller than the value ωo (S134:NO), the process proceeds to S135, and the condition of a steeply curved travel of the vehicle is determined. That is, whether or not the lateral acceleration G is equal to or exceeding the acceleration Go is determined. The lateral acceleration Go is set to a sufficiently great value that makes it difficult for the vehicle to maintain a stable travel condition in the steeply curved travel if the lateral acceleration of that magnitude is applied to the vehicle.

When all of the determination results of S133 to S135 are "NO," it is assumed that the stable travel of the vehicle can be easily achieved (S13:YES) even when the speed V of the vehicle exceeds the value Vo (S132:YES). On the other hand, when at least one of S133 to S135 is "YES," it is assumed that the stable travel of the vehicle can not be achieved, and the process proceeds to S17 (S13:NO).

In S17, the electric motor 33 is driven to generate the maximum reaction force Rmax (see FIG. 4), and the command input from the operation knob 23 is prohibited (S17). Thus, the mis-input is prevented due to the prohibition of the command input, thereby effectively reducing a psychological pressure for the user coming from a fear of the mis-input.

The above embodiment can thus be summarized that real-time behavioral information of the vehicle including the vehicle speed V, the step amount B, the steer angle θ, and the lateral acceleration G is used to determine whether the operation of the operation unit 20 should either be allowed or prohibited. Therefore, even when the travel condition of the vehicle is unstable due to the steep braking, steep turn, or steeply curved travel, the user's attention can be turned from the operation of the operation unit 20 to the driving operation of the vehicle, thereby easily stabilizing the travel condition of the vehicle by providing plenty of room, in the user's mind, for maintaining the concentration on the driving operation.

Further, in the above embodiment, the maximum reaction force Rmax is provided for the operation knob 23 from the electric motor 33, thereby allowing the user, through haptic sensation (i.e., haptic stimulus, haptic feedback) of the haptic device (i.e., the operation unit 20), to instantly recognize that the operation of the operation unit 20 is currently under restriction. That is, the concentration of the driver on the driving operation can be preferably maintained, because the user saves the confirmation operation for confirming that the operation of the operation unit 20 is under restriction by, for example, watching the display unit 11.

In the above embodiment, for finding that the vehicle is in a steeply braking condition, the stepping speed of the brake pedal is determined based on the calculation of dB/dt that is derived from the step amount B. However, the steep braking condition may also be determined based on, for example, the increase speed of the oil pressure in the wheel cylinder, or the deceleration index from the front-rear direction acceleration sensor.

Furthermore, the steeply curved travel of the vehicle may also be determined, instead of using the angular steer speed of the steering wheel H, based on, for example, the lateral acceleration G from the side G sensor, or the lateral acceleration G from a yaw rate sensor.

b. Second Embodiment

Figure 7:
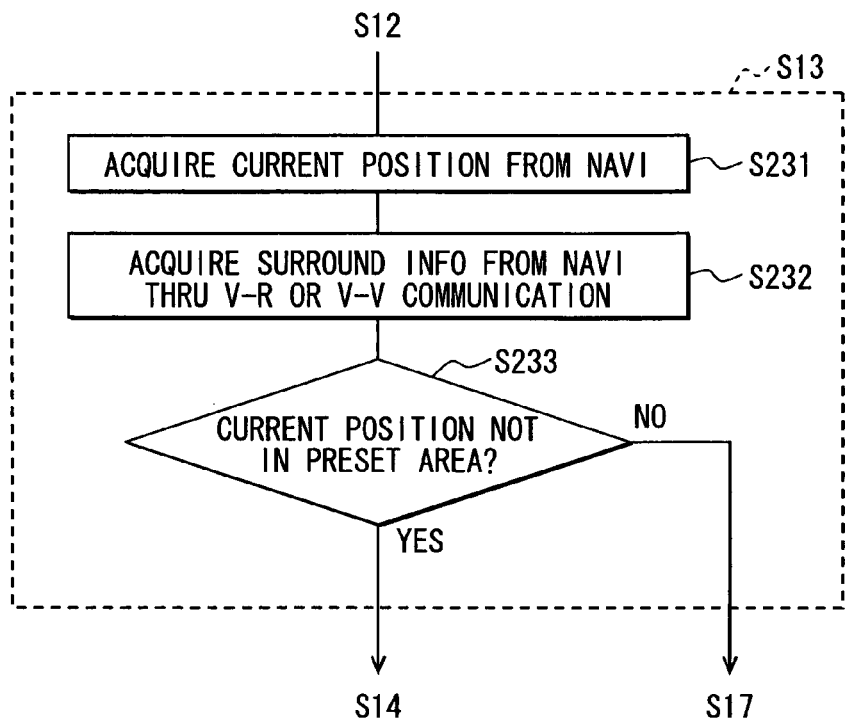
FIG. 7 is a flow chart of the step in the process for controlling the device operation system in FIG. 1 in a second embodiment of the present disclosure.

In the second embodiment, the vehicle is assumed to be capable of having an inter-vehicle communication through the navigation system NS, that is, communication between vehicles, or communication between a road-side unit and a vehicle. That is, as shown in FIG. 3, information in association with the surroundings of the current position of the subject vehicle is acquired from a management center 51, a roadside unit 52, or an other vehicle 53 (shown in blocks with the broken line), through the navigation system NS. In this case, the management center 51, the roadside unit 52, and the other vehicle 53 respectively serve as a travel condition acquisition unit. Further, the control unit 40 performs S231 to S233 in FIG. 7, instead of performing S131 to S135 in FIG. 6, in the course of executing S13 of the control program in FIG. 5.

In S13 of the present embodiment, the information on the current position of the vehicle is acquired through the navigation system NS (S231). Then, the information in association with the surroundings of the current position of the vehicle is acquired by the inter-vehicle communication through the navigation system NS (S232). The information in association with the surroundings of the current position of the subject vehicle includes a clue that suggests a steep braking or a steep turn of the vehicle expected after now, that is, in the near future. In other words, for example, a successively curved road, a rotary, an intersection or the like that can hardly be recognized or perceived at the current position of the vehicle is provided in this information. When the current position of the vehicle is determined to be reaching the curvy road based on the information (S233:NO), processing in S17 is executed.

According to the process scheme in the present embodiment, the maximum reaction force Rmax is provided for the operation knob 23 from the electric motor 33, when the vehicle reaches a position where a steep braking or a steep turn is expected on the basis of information in association with the surroundings of the current position of the vehicle (S233:NO), thereby letting the user know that the operation of the operation unit 20 is restricted through haptic sensation in a timely manner. Therefore, the user can intuitively recognize the restriction of the operation of the operation unit 20 without seeing the display unit 11 or other devices for confirmation of the operation restriction, thereby allowing the driver the continuation of concentration on the driving operation of the vehicle, or, in other words, without disrupting the concentration on the driving operation, which makes it easy for the driver to stabilize the travel condition of the vehicle.

c. Third Embodiment

Figure 8:
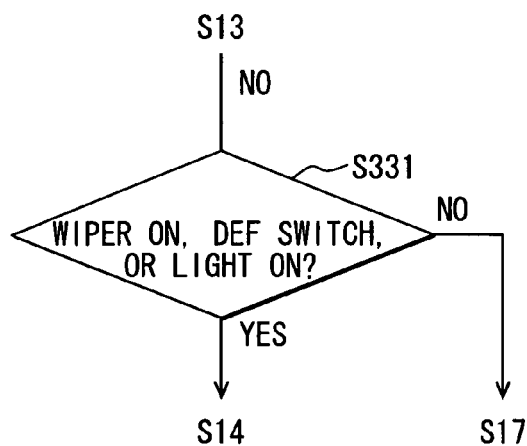
FIG. 8 is a step corresponding to a specific operation in a flow chart for controlling the device operation system in FIG. 1 in a third embodiment of the present disclosure.

In the third embodiment, a wiper controller 61, an air conditioning system 62, and a light controller 63 are connected with the control unit 40 as shown by the broken line in FIG. 3, and the operation of a wiper 64 as well as the switching of the defroster of the air conditioning system 62 and the lighting operation of a light 65 (i.e., a headlight, a fog lamp, etc.) are configured to be controlled by the operation unit 20. Further, after the determination of "NO" in S13 of the control program by the control unit 40 (see FIG. 5), S331 in FIG. 8 is configured to be performed.

In S331 of the present embodiment, whether the wiper 64 is operated, whether the air conditioning system 62 is switched to the defroster, or whether the light 65 is turned on, is determined. The wiper 64, the defroster of the air conditioning system 62, and the light 65 are indispensable and important for securing the view of the driver and for the stable travel of the vehicle.

Therefore, even when the determination in S13 is "NO," that is, even when the travel condition of the vehicle is unstable, the operation of the operation unit 20 for controlling the wiper 64, the defroster of the air conditioning system 62 or the light 65 is allowed. In this manner, the view of the driver in the traveling vehicle is secured, thereby enabling the stabilization of the travel of the vehicle.

Further, though, in the first to third embodiments, the command input from the operation knob 23 is prohibited beside providing the maximum reaction force Rmax for the knob 23 from the electric motor 33 in S17 of FIG. 5, the prohibition of the command input from the operation knob 23 may be omitted. This is because the maximum reaction force Rmax provided for the operation knob 23 substantially prohibits the input operation of the operation unit 20. As a result, the haptic communication function, that is, the notification function for notifying the restriction of the operation of the operation unit 20 through haptic sensation, as well as the restriction function for restricting the operation of the operation unit 20 are provided only by controlling the reaction force from the electric motor 33, thereby enabling a simplified configuration of the remote operation apparatus.

Further, the reaction force provided in S17 from the motor 33 may be changed to other amount. That is, though, in the first to third embodiments, the maximum reaction force Rmax is provided against the operation of the operation knob 23 in S17, a reaction force that is greater than the standard reaction force Rst and smaller than the maximum reaction force Rmax may be generated, or the generation of the reaction force may be stopped (i.e., a reaction force of zero may be used). The user can also perceive, through these modified type haptic sensation, that the operation of the operation unit 20 is currently restricted.

(Modifications)

Figure 9:
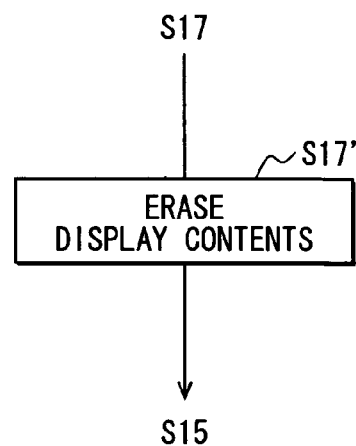
FIG. 9 is a step corresponding to additional processing contents in a flow chart for controlling the device operation system in FIG. 1 in a third embodiment of the present disclosure.

Although the present disclosure has been fully described in connection with preferred embodiment thereof with reference to the accompanying drawings, it is to be noted that various changes and modifications will become apparent to those skilled in the art. That is, for example: the haptic device (i.e., the operation unit 20) used in the above embodiments may be replaced with a so-called prompter device that uses a touch input on an operation panel based on the display contents of the display unit 11. The prompter device usually uses the two-dimensional coordinates of the operation panel that has a one-to-one correspondence to the coordinates on the display screen for accepting the input from the operation panel. Though the prompter device is not capable of notifying the user of the restriction of the operation through haptic sensation, S17' described in FIG. 9 may be added to the process of the control program in FIG. 5 to let the user know, through visual notification, that the operation of the operation panel is currently restricted. In this manner, the user can be promptly notified that the operation of the operation panel is restricted through the visual message, thereby allowing the non-interrupted concentration of the driver on the driving operation. Further, in this case, instead of erasing the display contents, a text message such as NO INPUT ALLOWED, INPUT RESTRICTION IN FORCE or the like, for example, may be used to notify the restriction of the operation.

Such changes, modifications, and summarized scheme are to be understood as being within the scope of the present disclosure as defined by appended claims.

What is claimed is:

1. A remote operation apparatus comprising:
an operation unit for remotely operating display contents displayed on a display unit, the operation unit further including an electric actuator for generating a variable reaction force according to an operation of the operation unit;
a travel condition acquisition unit for acquiring information on a travel condition of a subject vehicle, wherein the information on the travel condition of the subject vehicle at least suggests whether a current speed V of the subject vehicle is greater than or equal to a threshold vehicle speed Vo; and
a control unit for, based on the information acquired by the travel condition acquisition unit,
    (a) allowing an operation of the operation unit when the travel condition of the subject vehicle is determined to be in a stable condition and
    (b) restricting the operation of the operation unit when the travel condition of the subject vehicle is determined to be in a non-stable condition, wherein
the control unit controls the electric actuator to generate respectively different reaction forces for when operation of the operation unit is allowed and for when operation of the operation unit is restricted,
when the control unit determines that the information on the travel condition of the subject vehicle suggests that the current speed of the vehicle V is equal to or greater than the threshold vehicle speed Vo, the control unit determines that the travel condition of the subject vehicle is in a non-stable condition, and allows an operation device operator to recognize that an operation of the operation device is restricted through haptic sensation of the operation device by increasing the reaction force generated by the electric actuator to a maximized force in comparison to a reaction force generated when the operation of the operation device is allowed.

2. The operation apparatus of claim 1, wherein
the information on the travel condition is in association with surroundings of the current position of the subject vehicle, and
the information on the travel condition has contents suggesting at least one of a steep braking and a steep turn expected in the future by the subject vehicle, acquired from the subject vehicle, a management center communicable with the subject vehicle, a road side unit communicable with the subject vehicle, or other vehicles communicable with the subject vehicle.

3. The operation apparatus of claim 1, wherein the control unit allows a specific operation of the operation unit and does not generate a reaction force that is the maximized force even when the travel condition of the subject vehicle is determined to be in the non-stable condition.

4. The operation apparatus of claim 3, wherein the operation unit is capable of controlling operation of one of a wiper, a defroster of an air-conditioning system, and a light, and
the specific operation is the controlling operation of one of the wiper, the defroster of the air-conditioning system, and the light.

5. The operation apparatus of claim 1, wherein the control unit prohibits a command input from the operation unit when the travel condition of the subject vehicle is determined to be in a non-stable condition.

6. A remote operation apparatus in a vehicle, comprising:
a navigation system including a display unit; and
a centralized device operation system including
an operation unit that remotely operates display contents displayed by the display unit based on tactile manipulation of the operation unit;
at least one travel condition sensor that senses at least one travel condition of the vehicle;
a control unit that makes a stability determination of the vehicle based on a comparison of the at least one travel condition with at least one threshold corresponding to the at least one travel condition; and
a reaction force generation unit that generates a reaction force to the tactile manipulation of operation unit, the reaction force being of a variable magnitude which is based upon a stability determination of the vehicle,
the reaction force being of a maximized degree such that the tactile manipulation of the operation unit is restricted when the control unit determines the stability of the vehicle to be not stable based upon the comparison of the at least one travel condition with the at least one threshold corresponding to the at least one travel condition,
the reaction force being less than the maximized degree such that tactile manipulation of the operation unit is available when the control unit determines the stability of the vehicle to be stable based upon the comparison of the at least one travel condition with the at least one threshold corresponding to the at least one travel condition, and
the reaction force being less than the maximized degree such that tactile manipulation of the operation unit is available when the control unit determines that the at least one travel condition vehicle is stable based on the at least one travel condition with the at least one threshold corresponding to the at least one travel condition.

* * * * *